US011925955B2

(12) United States Patent
Marcolin et al.

(10) Patent No.: US 11,925,955 B2
(45) Date of Patent: Mar. 12, 2024

(54) ROLLER LEATHER FINISHING MACHINE

(71) Applicant: ROTACOAT S.R.L., Pisa (IT)

(72) Inventors: Diego Marcolin, Pisa (IT); Lorenzo Simoni, Pisa (IT)

(73) Assignee: ROTACOAT S.R.L., Pisa (IT)

( * ) Notice: Subject to any disclaimer, the term of this patent is extended or adjusted under 35 U.S.C. 154(b) by 0 days.

(21) Appl. No.: 17/757,598

(22) PCT Filed: Dec. 18, 2020

(86) PCT No.: PCT/IB2020/062185

§ 371 (c)(1),
(2) Date: Jun. 17, 2022

(87) PCT Pub. No.: WO2021/124248

PCT Pub. Date: Jun. 24, 2021

(65) Prior Publication Data

US 2023/0019709 A1 Jan. 19, 2023

(30) Foreign Application Priority Data

Dec. 20, 2019 (IT) ........................ 102019000025099

(51) Int. Cl.
*B05C 1/08* (2006.01)
*C14B 1/34* (2006.01)
*C14C 15/00* (2006.01)

(52) U.S. Cl.
CPC .............. *B05C 1/0856* (2013.01); *C14B 1/34* (2013.01); *C14C 15/00* (2013.01)

(58) Field of Classification Search
USPC .......................................................... 118/258
See application file for complete search history.

(56) References Cited

U.S. PATENT DOCUMENTS 16,205 A * 12/1856 Berry ........................ C14B 1/30 69/43
1,050,218 A * 1/1913 Lapham ................... A43D 1/08 33/501.01

(Continued)

FOREIGN PATENT DOCUMENTS

CN 105396748 A * 3/2016 ............... B05C 1/12
CN 105396748 A 3/2016

(Continued)

OTHER PUBLICATIONS

International Search Report and Written Opinion for Corresponding International Application No. PCT/IB2020/062185, 12 pages, dated Mar. 12, 2021.

*Primary Examiner* — Jethro M. Pence
(74) *Attorney, Agent, or Firm* — Lucas & Mercanti, LLP

(57) ABSTRACT

The present invention relates to a spreading machine for roller leather finishing. The machine includes a drawing cylinder and an engraved spreading cylinder. The drawing cylinder acts as a driving roller for a rubber conveyor belt wound between the driving roller and an idle roller. The drawing cylinder has a conveying surface and a rubber layer. In each operating configuration, the conveying surface of the rubber conveyor belt is tangent to the engraved spreading cylinder in a point of tangency (P), and the idle roller has a leather-detachment roller having a diameter within the range of 10 and 80 mm.

11 Claims, 7 Drawing Sheets

(56) References Cited

U.S. PATENT DOCUMENTS 1,313,510 A * 8/1919 Wright .................. A43D 11/14 12/41.3
1,382,504 A * 6/1921 Hall ........................ C14B 11/00 69/7.7
1,450,933 A * 4/1923 Geoffrey .................. C14B 1/44 69/46
1,465,092 A * 8/1923 Respess ............... D06N 3/0088 427/365
1,496,808 A * 6/1924 Hulbert ..................... C14B 1/00 69/41
1,523,592 A * 1/1925 Hintenach ................. C14B 1/44 69/45
2,333,369 A * 11/1943 Glickman ..................... 118/227
2,396,421 A * 3/1946 Henning ................... C14B 1/30 69/46
2,399,819 A * 5/1946 Moore ...................... C14B 1/30 69/43
2,510,913 A * 6/1950 Smith ....................... C14B 1/30 74/109
2,540,132 A * 2/1951 Mcmath .................... C14B 1/30 69/46
2,797,444 A * 7/1957 Takagi ..................... D01G 1/08 19/0.41
2,836,048 A * 5/1958 Scott ....................... C14C 15/00 118/235
3,060,714 A * 10/1962 Josef ......................... C14B 1/14 73/304 C
3,085,421 A * 4/1963 Bucek ....................... C14B 1/44 69/42
3,252,416 A * 5/1966 Allen ...................... B41F 35/02 101/142
3,530,694 A * 9/1970 Hevenor ................... C14B 1/30 69/46
3,654,781 A * 4/1972 Plechac ..................... C14B 1/26 69/41
3,902,338 A * 9/1975 Kessler ................... C14C 15/00 69/29
3,910,077 A * 10/1975 Kessler ..................... C14B 1/30 69/32
4,471,692 A * 9/1984 Hefele ...................... B41F 9/00 101/157
4,509,214 A * 4/1985 Shea ....................... A41F 9/002 2/322
5,235,829 A * 8/1993 Belluzzi .................. B05C 1/083 69/32
5,238,234 A * 8/1993 Kerber ...................... C14B 1/34 271/228
6,685,746 B1 * 2/2004 Painter ...................... D06P 3/32 8/94.22
7,431,794 B2 * 10/2008 Kanagawa ........... D06N 3/0065 427/247

FOREIGN PATENT DOCUMENTS

CN 107961945 A * 4/2018 ........... B05C 1/0808
CN 107961945 A 4/2018
CN 108774653 A * 11/2018 ........... C08G 18/348
CN 108774653 A 11/2018

* cited by examiner

ROLLER LEATHER FINISHING MACHINE

CROSS-REFERENCE TO RELATED APPLICATIONS

This application is a 371 of PCT/IB2020/062185, filed Dec. 18, 2020, which claims the benefit of Italian Patent Application No. 102019000025099, filed Dec. 20, 2019.

BACKGROUND

Currently two types of spreading machines for reverse roller natural leather finishing, that is which make use of an engraved spreading cylinder rotating in opposite direction with respect to the direction of the underlying transportation system, coexist:

A first type comprises spreading machines equipped with rubber conveyor belt performing counterpart/contrast functions and at the same time acting as transportation for the leathers outgoing from the spreading area.

A second type comprises spreading machines equipped with counterpart/contrast rubber roller which require an autonomous leather transportation system in order to be able to convey leathers towards the exit.

Upon dwelling on analysing what happens in the contact area between the spreading roller and the underlying contrast and/or transportation system, that is where the leathers are subjected to the contact mechanical action with the spreading roller which discharges thereon by friction the finishing chemical product contained in the cavities created by the engraving on the surface of the same, in case of machines of the first type it happens as follows:

a) a large contact surface is offered by the conveyor belt which obviously has a contact area having roughly flat or however flattened shape. It follows that the specific pressure for a given load exerted between spreading roller and contrast roller will be relatively reduced.

b) an irregular shape of the contact area considering the necessarily inaccurate geometry of a conveyor belt made of rubber/cloth; shape which will depend even upon the working conditions of the same that is upon the required tension thereto it is subjected by acting upon the distance of the external idler roller and upon the real state of the surface of the conveyor belt as well as upon its level of planarity.

On the contrary, in case of the machines of the second type, there will be:

a) a relatively reduced (with respect to the previous case) contact surface between spreading roller and contrast roller, directly proportional to the diameter difference between the two cylinders. As a consequence, there will be that in a hypothetical comparison between conveyor belt system and rubber contrast roller system, the load exerted between the spreading and the roller being equal, the specific pressure obviously will be higher in the last case.

b) a more defined geometry of the contact surface thanks to the regular shape offered by the rubber roller; this makes possible to obtain a very high control of the specific pressure that is a high-pressure uniformity on the whole table span offered by the machine.

Whatever the adopted solution is, the rubber layer must have a high thickness to guarantee the required "squeezing" of leathers between the spreading and the contrast roller. In fact, the leathers of animal origin have relevant thickness differences between different areas of the same and corresponding to different anatomical portions of the animal apart from the presence of natural wrinkles, folds and prominent and localized depressions. It follows that in order to be able to guarantee a contact as homogeneous as possible between the spreading roller and the surface of the leather to be covered, upon the passage between the spreading and contrast roller (be it a roller or a rubber conveyor belt) the leather must be able to "sink" easily in the rubber layer which traces and absorbs on the bottom the shapes thereof by offering on the other hand a surface as flat as possible to the "flower" side, that is the upper portion in contact with the spreading roller; this because the leather surface has to be spread and finished with a layer of chemical product (resins, pigments etc.) as uniformly as possible.

However, in case of spreading machines equipped with rubber conveyor belt, the fact of having to rely on a very high rubber thickness in the contact area between spreading roller and contrast conveyor belt with the purpose of being able to compensate effectively the natural thickness non-uniformity and surface irregularity of leathers and then to put the machine under condition of being able to spread a layer as uniformly as possible of a finishing product on its surface, has as natural consequence the fact that the rubber conveyor belt (rubber/cloth) must have a high thickness (14-20 mm). This involves the following limitations:

a) Differences in high peripheral speed between the area which is wound around the driving roller (having relevant diameter) and the one immediately downstream of the spreading area. In fact, the peripheral speed of the rubber portion wound onto the counterpart cylinder (also called drawing or driving cylinder if motorized) is direct function of the diameter of the drawing cylinder (DT [m]), of the conveyor belt thickness (ST [m]) and of the rotation speed of the transportation cylinder (VT [rpm]). Then: Vperif1.portion wound [m/min]=(D+2ST)×π×VT. The peripheral speed of the horizontal branch, on the contrary, is proportional only to the diameter DT [m] of the counterpart cylinder and to its rotation speed VT [rpm]. Then: Vperif2.horizontal branch [m/min]=(DT×π×VT).

b) need for using a driven (drawing) roller having relatively high diameter and then with large radius of curvature whereon the thickness of the conveyor belt is to be wound, without damaging it with fatigue stresses.

As a consequence, in case a) there will be that the (anterior) portion of leather outgoing from the spreading area wherein it is anchored to the conveyor belt travelling at speed Vperif1, is subjected to an immediate slowing down after exit, where it travels at speed Vperif2 and then the anterior portion of the leather, since it is not elastic like the rubber whereon it is spread, will tend to become hunched and to raise from the conveyor belt by forming waves having extent the more relevant the greater the difference between the two speeds and then the two diameters is. The extent/seriousness of waves at last will be directly proportional to the thickness of the wound conveyor belt.

On the contrary, in case b) there will be the need for equipping the machine with a leather-detachment mechanical device (also called leather-detachment roller conveyor).

The above-mentioned leather-detachment device/roller conveyor represents an additional element subjected to continuous maintenance and potential source of dangerous jamming of leathers which under determined conditions can be hooked and/or locked by causing the total or partial destruction thereof with related expensive machine downtime. Moreover, this device, by getting dirty, since it is in continuous contact with the chemical products applied by the spreading roller on the surface (flower) of the leather, then inevitably contaminates the lower side thereof (flesh)

during processing of the subsequent leathers by causing an economic loss due to waste of contaminated portions.

On the contrary, in case of spreading machines equipped with contrast/counterpart rubber roller, the presence of a contrast/counterpart rubber roller having relevant diameter and without conveyor belt involves the need for equipping the machine with:

a) an effective leather-detachment mechanical device (leather-detachment roller conveyor) which substantially has to be rested upon the surface of the rubber cylinder by leaving a gap as little as possible. However, with respect to a homologous leather-detachment roller conveyor of a rubber conveyor belt, the one acting on a counterpart rubber roller has to be still more precise considering the greater difficulty in detaching effectively the leathers which, upon outgoing, tend to adhere by "vacuum effect" to the surface kept suitably humid by a washing system equipped with brush and scraping blade.

b) an independent transportation system which receives the leathers coming from the detachment roller conveyor, keeps them suitable spread and transfers them to the adjacent machine or drying oven.

As a consequence, in case a) there will be that the leather-detachment device/roller conveyor represents an element subjected to continuous maintenance and potential source of dangerous jamming of leathers which under determined conditions can be hooked and/or locked by causing the total or partial destruction thereof with related expensive machine downtime. Moreover, this device, by getting dirty, since it is in continuous contact with the chemical products applied by the spreading roller on the surface (flower) of the leather, then inevitably contaminates the lower side thereof (flesh) during processing of the subsequent leathers by causing an economic loss due to waste of contaminated portions.

As far as case b) is concerned, it is an additional device (with multiple diverging belts or single belt) which has to collect the leathers thereon a layer of chemical product (paint) has been previously applied. It is a fresh and semi-liquid product which is easily transferred by contact and similarly to what said about the detachment roller conveyor, it also makes dirty the mobile elements of the independent transportation system (belts) and thereby it is then transferred to other leathers in sequence by contaminating them and causing an economic loss due to waste. Should the spreading machine, for technical needs, be put in line or in series with another equivalent and/or homologous machine without interposition of drying systems, the contamination of chemical products would be extended from a machine to the other one with multiplying effect, by involving additional machine parts constituting the conveyor belt supply system and then by worsening the described problems even more.

For example, known art machines are described in the following documents.

CN107961945A falls within the technical field of leather roller coating and roller spreading apparatuses and in particular it relates to an inverse roller spreading machine for sheepskins for garments.

CN105396748A relates to the technical field of the roller coating apparatuses, in particular it describes a roller spreading machine with high soft leather passing rate.

CN108774653A falls within the technical field of the leather processing, and in particular it relates to a machine for pre-painting the leather with an aqueous coating agent, a device for processing the leather surface and a related process.

Technical Problem Solved by the Invention

The object of the present invention is to solve the problems left open by the know art, by providing a machine as defined in claim 1.

Additional features of the present invention are defined in the corresponding depending claims.

In order to do this, one has thought to a system which comprises a soft rubber counterpart roller which transmits the motion to a still soft rubber transportation belt/conveyor belt.

The transportation system of the rubber conveyor belt is equipped with an idler roller which performs the function of leather-detachment roller.

Moreover, advantageously, the system can be provided with a mobile idler roller positioned between the driving roller which acts as contrast and the leather-detachment idle one in order to be able to vary the output angle of leathers from the spreading area.

This combination allows to obtain both a high mechanical effect not disjointed from pressure uniformity on the leather to be spread typical of the machines equipped with rubber counterpart roller and on the contrary, where needed, a reduced pressure thanks to the increase in contact surface typical of the machines equipped with conveyor belt which acts both as contrast and transportation. The increase in the contact surface and then the dilution of the specific pressure is obtained by raising the mobile roller positioned in abutment under the conveyor belt; this increase is required when chemical products are spread (mix of resins and sometimes pigments) with very high viscosity such as stucco and upgrading of various nature.

The combination represented by the conveyor belt with reduced thickness wound onto a rubber counterpart roller allows to simulate the behaviour of a rubber conveyor belt having relevant thickness by making that the leather "sinks" in the rubber thickness resulting from the sum of the thickness of the conveyor belt plus the counterpart roller rubber. The thickness irregularities of leathers are then compensated and the chemical product layer can be spread onto the surface uniformly.

The use of a transportation rubber conveyor belt having reduced thickness further allows to prevent waviness of leathers outgoing from the spreading area due to the different peripheral speed between the rubber portion wound onto the counterpart cylinder, which is proportional to the total diameter of the cylinder (DT [m]), to the thickness of the conveyor belt (ST [m]) and to the rotation speed of the transportation cylinder (VT [rpm]). Then: Vperif1.portion wound [m/min]=$(D+2ST)\times\pi\times VT$. On the contrary, the peripheral speed of the horizontal branch is proportional only to diameter DT [m] of the counterpart cylinder and to its rotation speed VT [rpm]. Then: Vperif2.horizontal branch [m/min]=$(DT\times\pi\times VT)$.

The (anterior) portion of leather outgoing from the spreading area wherein it is anchored to the conveyor belt travelling at speed Vperif.1, in fact, is subjected to a slowing down after the exit, wherein it travels at speed Vperif.2 and then the leather anterior portion, since it is not elastic like the rubber whereon it is spread, will tend to become hunched and to raise from the conveyor belt by forming waves with extent the more relevant the greater the difference between the two speeds and then the two diameters is. The extent/ seriousness of waves ultimately will be proportional to the thickness of the wound conveyor belt.

Considering that in the currently existing machines a rubber conveyor belt having thickness of at least about 14 mm is used, the difference between the two peripheral speeds by using in its place a conveyor belt, the thickness thereof is equal to/lower than 8 mm, goes from about 7.5% to values equal to/lower than 4%.

Then, a value of 4%, or lower, results wholly tolerable, by making it to be easily compensated by drawing in opposite direction the remaining (posterior) portion of leather which at the same time remains pressed between the spreading roller which rotates in opposite direction (reverse) and the conveyor belt.

The excessive waviness of leathers in the existing machines can easily cause surface defects of the fresh finishing layer (paint) just applied by the spreading roller and which influences then the quality of the finished product.

The adoption of a transportation conveyor belt having reduced thickness then allows to be able to use even a leather-detachment idle cylinder with reduced diameter. The use of an idler cylinder with reduced diameter favours in a decisive way the final detachment of leathers from the rubber conveyor belt (to be transferred to another machine or to a drying oven) and it allows to be able to do without a leather-detachment mechanical system (called roller conveyer) which, by getting dirty in continuous contact with the chemical products applied by the spreading roller on the leather surface (flower), then inevitably contaminates even the lower side (flesh) during processing of subsequent leathers. Moreover, the above-mentioned leather-detachment device/roller conveyor represents an additional element subjected to continuous maintenance and potential source of dangerous jamming of leathers which under determined conditions can be hooked and/or locked by causing the total or partial destruction thereof with related expensive machine downtime. This problem affects both the machines equipped with transportation conveyor belt having great thickness and even more seriously the machines equipped with counterpart rubber roller which have to be necessarily equipped with a leather-detachment roller conveyor with very vigorous action in order to be able to detach and then transfer the leathers to the separate transportation system.

Other advantages, together with the features and the use modes of the present invention, will result evident from the following detailed description of preferred embodiments thereof, shown by way of example and not with limitative purpose.

BRIEF DESCRIPTION OF FIGURES

Hereinafter in this description the drawings shown in the enclosed figures will be referred to, wherein.

DETAILED DESCRIPTION OF PREFERRED EMBODIMENTS

The present invention will be described hereinafter by making reference to the above-mentioned figures.

Figure 1:
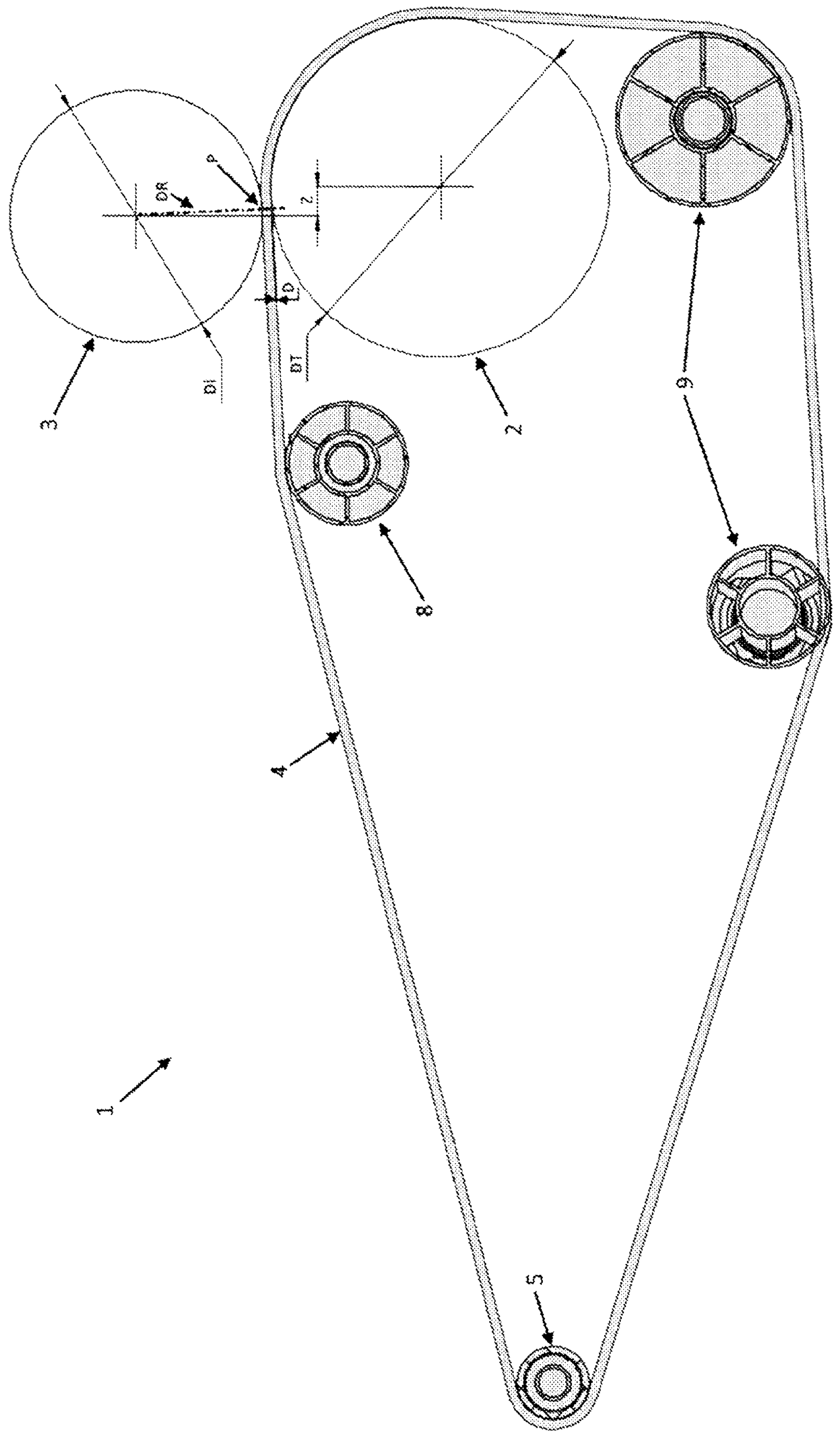
FIG. 1 is an overall schematic view of a machine according to the present invention in a first operating configuration.

In particular, FIG. 1, by way of example and according to a schematic view, shows a machine according to the present invention, at least in the parts relating to the present invention.

The machine 1 illustrated in FIG. 1 is intended to the reverse leather finishing.

It comprises a drawing cylinder 2 and an engraved spreading cylinder 3.

Moreover, the machine 1 comprises a rubber conveyor belt 4 wound between the drawing cylinder 2—acting as driving roller—and at least one idle roller 5, 8, 9. The drawing cylinder 2, in turn, comprises a rubber layer 6.

The configuration of the machine is so that, in each operating configuration, a conveying surface 7 of the rubber conveyor belt 4 is tangent to the engraved spreading cylinder 3 in a point of tangency P.

Advantageously, it is provided that one of the idle rollers 5, 8, 9 is a leather-detachment roller 5 and, according to the present invention, such leather-detachment roller 5 has a diameter DS comprised between 10 and 80 mm.

The advantages in having a leather-detachment roller with reduced diameter DS have already been discussed previously.

According to embodiments of the invention, the leather-detachment roller 5 has a diameter DS lower than 60 mm.

Figure 5:
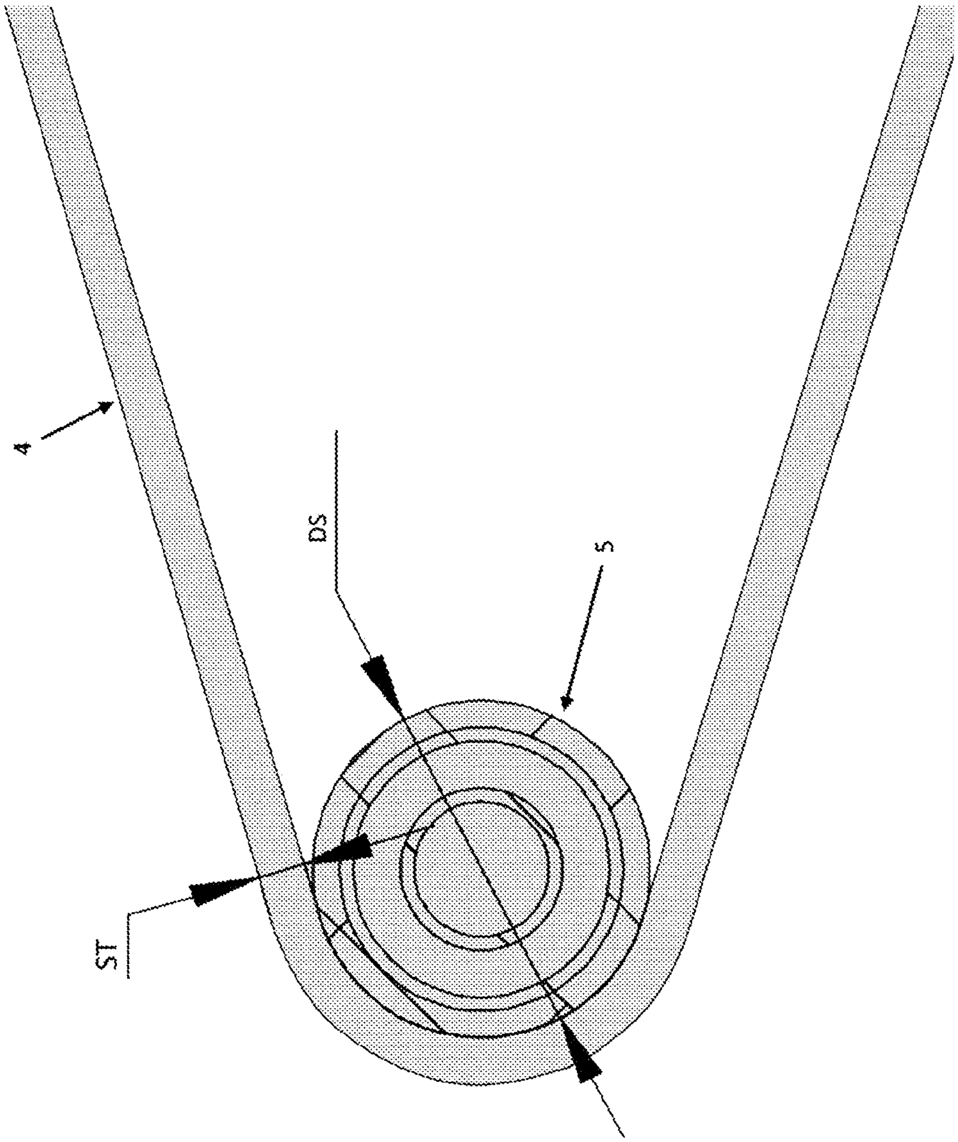
FIG. 5 is a detailed view of the leather-detachment roller.

FIG. 5 shows a detail of the leather-detachment roller 5.

Figure 6:
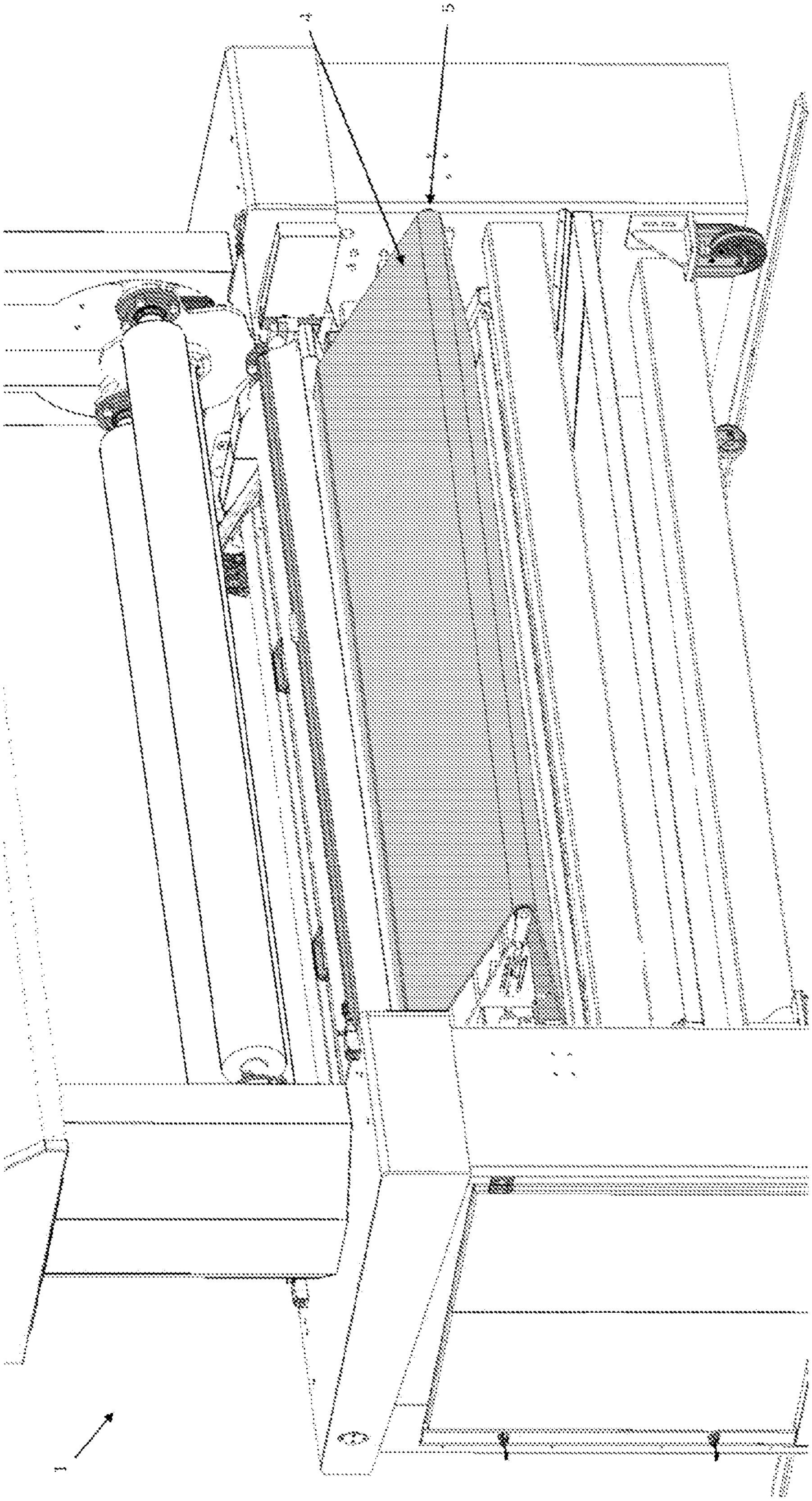
FIG. 6 is an overall view of the output section of the machine.
Figure 7:
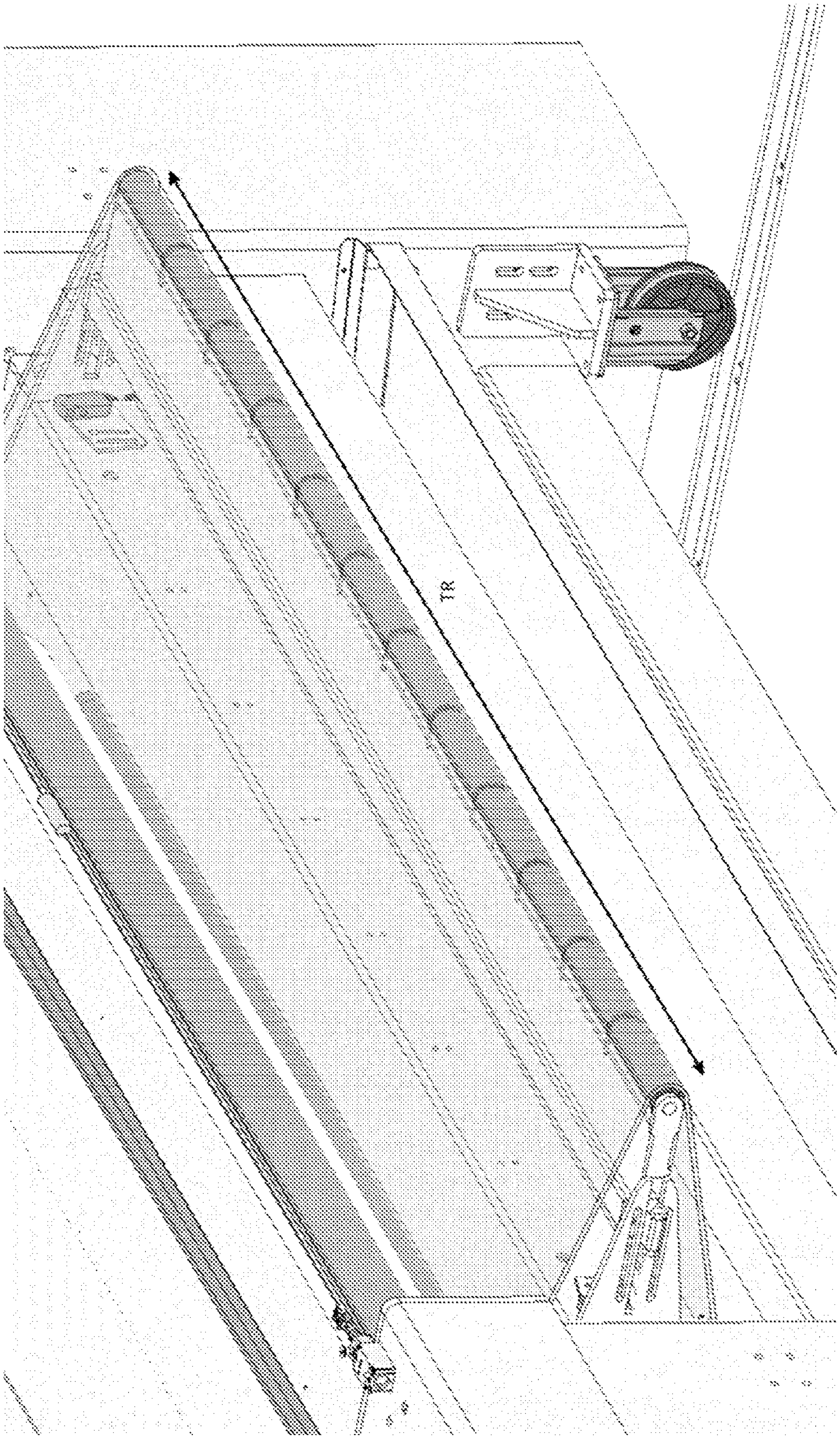
FIG. 7 is an overall view of the output section of the machine wherein the rubber conveyor belt is made transparent to show a possible configuration of the leather-detachment roller.

According to additional embodiments, the leather-detachment roller 5 can include a plurality of rollers arranged axially, with axis according to a transverse direction TR of the rubber conveyor belt 4. This possible configuration can be well seen in FIGS. 6 and 7, in particular in FIG. 7 which shows a machine according to the present invention at its output section. In particular in FIG. 7, where the rubber conveyor belt 4 is made transparent, the leather-detachment roller 5 is made visible which as a whole comprises a plurality of rollers arranged axially, with axis according to a transverse direction TR of the rubber conveyor belt 4, to cover the whole width of the rubber conveyor belt 4.

According to the present invention, the drawing cylinder 2 has an overall diameter DT within the range of 200 and 250 mm, whereas the spreading cylinder has a diameter DI within the range of 140 and 190 mm.

Preferably, the diameters of the two cylinders are however selected so that their ratio DT/DI is lower than 1.5. This involves a series of advantages in constructive terms.

According to a preferred embodiment, its rubber layer 6 has a thickness within the range of 10 and 30 mm. Its hardness can be comprised between 15 and 35 shore.

Advantageously, even the rubber conveyor belt has a hardness which can be measured in about 20-25 shore.

The rubber conveyor belt 4 has a thickness ST lower than 10 mm, preferably lower than 8 mm.

The reduced thickness ST of the conveyor belt, together with the reduced diameter DS of the leather-detachment roller, contributes to obtain an effective leather-detachment function, without defects.

Figure 2:
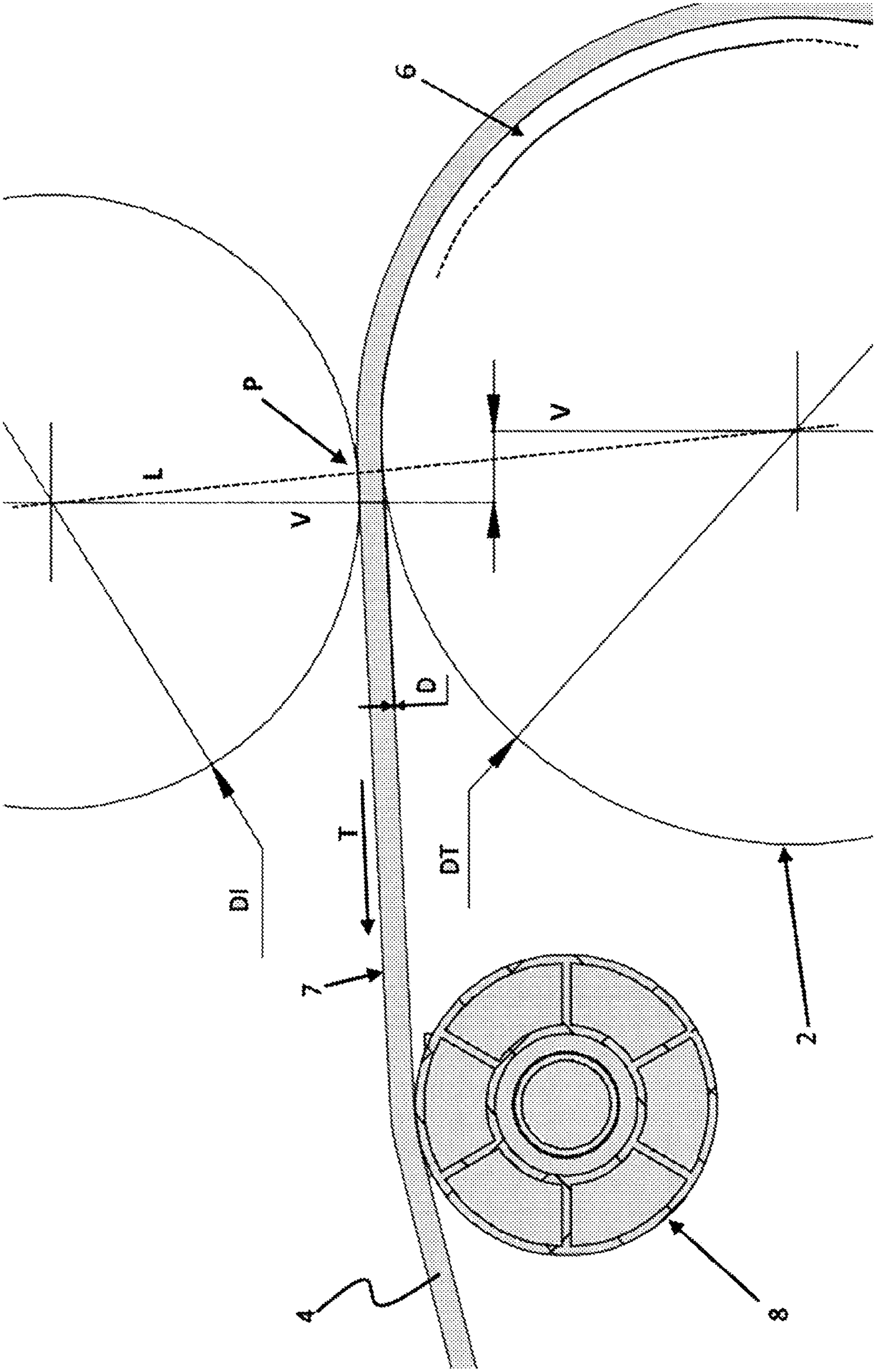
FIG. 2 is a detailed view of the contact area between the spreading roller and the underlying contrast and/or transportation system under the first operating condition.

With reference to FIG. 2, this shows an enlargement of the contact area between the spreading roller and the underlying contrast and/or transportation system in a first operating condition.

In such first operating condition, the arrangement of the machine is so that the point of tangency P between the spreading cylinder 3 and the conveying surface 7 of the rubber conveyor belt 4 falls exactly on the line L joining the centres of the drawing cylinder 2 and of the engraved spreading cylinder 3.

In this first operating condition, then, the point of tangency P is exactly at the drawing cylinder 2, thus guaranteeing a solid and effective contrast to the pressure exerted by the spreading cylinder 3.

Advantageously, the two cylinders, as in figures, can be offset with respect to a vertical line V and thus the line L joining the respective centres does not correspond exactly to the vertical V. Under vertical a line orthogonal to an ideal horizontal plane of the machine is meant.

This offset, as it will be clear, facilitates the adjustment of the machine in order to bring it from an operating condition to another one.

Figure 3:
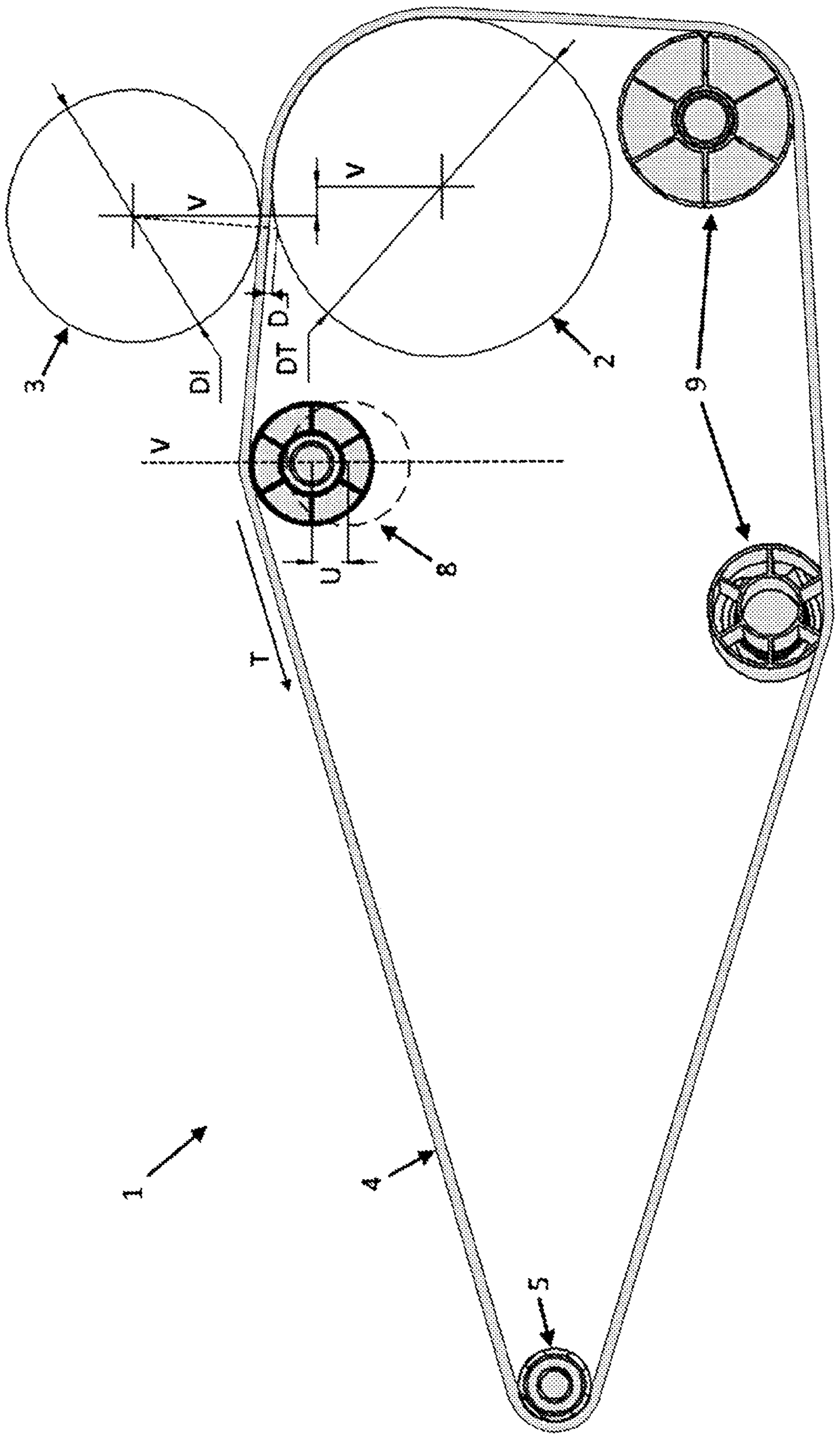
FIG. 3 is an overall schematic view of a machine according to the present invention under the second operating condition.
Figure 4:
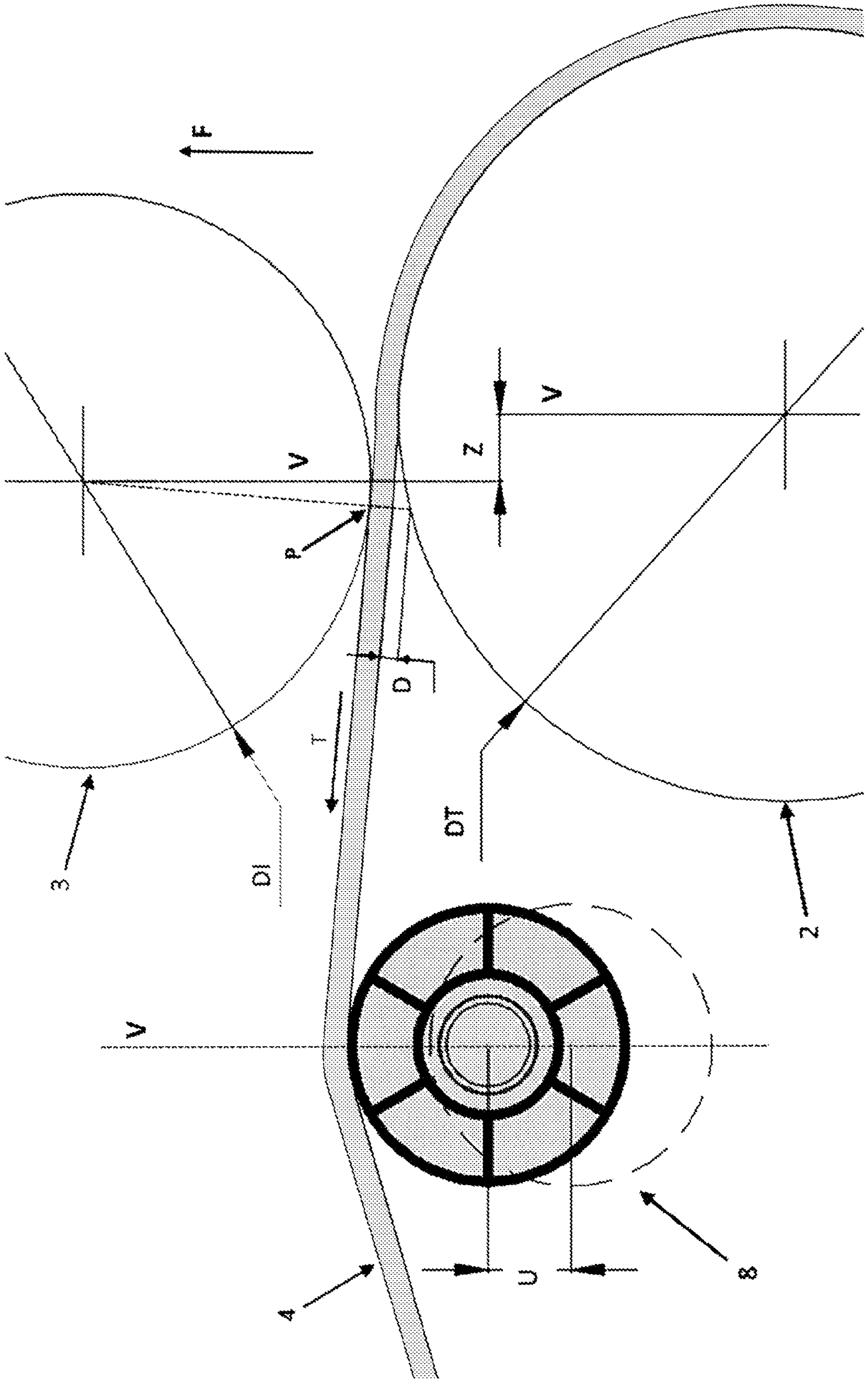
FIG. 4 è a detailed view of the contact area between the spreading roller and the underlying contrast and/or transportation system under the second operating condition.

The different operating conditions, as it is evident from FIGS. 3 and 4, are defined depending upon a distance D between the driving roller 2 and the rubber conveyor belt 4, measured along the direction that joins the point of tangency and the engraved spreading cylinder 3 with the rubber conveyor belt 4 and the centre of the engraved spreading cylinder 3.

The two different configurations cover a variation range of this distance D within 0 and 5 mm.

With the purpose of modifying such distance D an adjustment mechanism is provided so as to allow a corresponding translation of the point of tangency P along a longitudinal direction of the rubber conveyor belt 4, according to a transport direction T.

As illustrated in FIGS. 1 and 3, according to a possible embodiment, the adjustment mechanism comprises an intermediate idler roller 8, arranged between the driving roller 2 and the leather-detachment roller 5.

The rotation axis of the intermediate idler roller 8 can be translated between two predefined positions along the vertical V.

The translation along the vertical V of the intermediate idler roller 8 modifies the tilting of the conveyor belt 4 in the downstream tract, along the transport direction T, of the contrast area with the engraved spreading cylinder 3.

The adjustment mechanism can further provide a system for translating the rotation axis of the engraved spreading cylinder 3, still along the vertical V.

The translation of the rotation axis of the engraved spreading cylinder 3 along the vertical V, has the effect of increasing (or decreasing) the distance between the two cylinders 2, 3.

In a particularly preferred embodiment of the invention the adjustment mechanism provides the possibility of translating at the same time, according to a vertical direction V, both the intermediate idler roller 8 and the engraved spreading cylinder 3.

FIG. 4 represents a second operating condition of the machine 1, the conveyor belt 4 results to be more raised at the contact area between the cylinders and, consequently, it leaves a space D between the conveyor belt and the driving roller.

A contextual translation of the rotation axis of the engraved spreading cylinder 3 along the vertical V, upwards as shown by the arrow F in FIG. 4, causes the point of tangency P to move with respect to the operating condition of FIG. 2, by translating itself along the longitudinal direction of the rubber conveyor belt 4, according to the transport direction T.

In this second operating condition, the point of tangency P falls in a point wherein under the rubber conveyor belt 4 there is air (for a thickness D within the range of 0 e 5 mm). Then, evidently, in this point the spreading cylinder 3 will be subjected to a softer and more flexible contrast by the rubber conveyor belt 3 only.

The use of such device involves advantages from at least two points of view:

- the "functional" one: the machine comprises the advantages of both types of roller spreading machines currently on the market (with rubber conveyor belt and with rubber roller), by allowing to widen the range of implementable articles;
- the "management" one: by using a machine which allows to synthetize two different types of machine, it allows to manage the production in a more elastic and optimized way.

The present invention has been sofar described with reference to preferred embodiments thereof. It is to be meant that each one of the technical solutions implemented in the preferred embodiments, herein described by way of example, can be advantageously combined, differently with respect to what described, with the other ones, to create additional embodiments, belonging to the same inventive core and however all belonging in the protective scope of the herebelow reported claims.

The invention claimed is:

1. A reverse roller leather finishing machine, comprising a drawing cylinder and an engraved spreading cylinder, the drawing cylinder acting as a driving roller for a rubber conveyor belt wound between the driving roller and an idle roller and having a conveying surface, the drawing cylinder comprising a rubber layer, configured such that in each operating configuration, the conveying surface of the rubber conveyor belt is tangent to the engraved spreading cylinder in a point of tangency (P), wherein said idle roller comprises a leather-detachment roller having a diameter within a range of 10 and 80 mm.

2. The machine according to claim 1, wherein said rubber layer has a hardness within the range of 15 and 35 shore.

3. The machine according to claim 1, wherein said rubber layer has a thickness within the range of 10 and 30 mm.

4. The machine according to claim 1, wherein said rubber conveyor belt has a hardness within the range of 20 and 25 shore.

5. The machine according to claim 1, wherein said rubber conveyor belt has a thickness lower than 10 mm.

6. The machine according to claim 1, further comprising a mechanism for adjusting a distance (D) between the driving roller and the rubber conveyor belt, measured along a direction that joins the point of tangency (P) of the engraved spreading cylinder with the rubber conveyor belt and a centre of the engraved spreading cylinder, said mechanism allowing a corresponding translation of the point of tangency (P) along a longitudinal direction of the rubber conveyor belt.

7. The machine according to claim 6, wherein said distance (D) is between 0 and 5 mm.

8. The machine according to claim 6, wherein said mechanism comprises an intermediate idler roller, arranged between said driving roller and said leather-detachment roller, whose rotation axis can be translated between two predefined positions along a direction (V) substantially orthogonal to the conveying surface of the rubber conveyor belt.

9. The machine according to claim 6, wherein said mechanism comprises a system for translating a rotation axis of the engraved spreading cylinder along a direction (V).

10. The machine according to claim 1, wherein said leather-detachment roller comprises a plurality of rollers arranged axially, with their axis according to a transverse direction (T) of the rubber conveyor belt.

11. The machine according to claim 5, wherein said rubber conveyor belt has a thickness lower than 8 mm.

* * * * *